United States Patent

Buckman et al.

[15] 3,670,004

[45] June 13, 1972

[54] THIOCYANO SUBSTITUTED ACRYLATES AND PROPIONATES AND THEIR USE AS PESTICIDES

[72] Inventors: Stanley J. Buckman; John D. Buckman; John D. Pera; Fred W. Raths, all of Memphis, Tenn.

[73] Assignee: Buckman Laboratories, Inc., Memphis, Tenn.

[22] Filed: Jan. 7, 1969

[21] Appl. No.: 789,620

[52] U.S. Cl.................260/454, 8/94.19, 162/161, 210/64, 424/302
[51] Int. Cl........................................C07c 161/02
[58] Field of Search............260/454, 486; 424/302, 304, 424/314

[56] References Cited

UNITED STATES PATENTS

| | | | |
|---|---|---|---|
| 3,212,963 | 10/1965 | Wehner | 260/454 |
| 3,358,016 | 12/1967 | Kohll et al. | 260/454 |
| 3,483,296 | 12/1969 | Martin et al. | 260/454 |
| 2,077,478 | 4/1937 | Hollander et al. | 260/454 |
| 2,673,875 | 3/1954 | Anspon | 260/486 |
| 2,722,554 | 11/1955 | Otto | 260/454 |
| 3,037,905 | 6/1962 | Laasko | 424/302 |
| 3,097,998 | 7/1963 | Miller | 424/314 |
| 3,318,936 | 5/1967 | Sakai et al. | 260/454 |

OTHER PUBLICATIONS

Riemschneider et al. "Thiocarbonates, etc.," (1953) CA 48 p. 5112 (1954).
Kawamura et al. " Chemicals for Controlling Newatodes" (1958) CA 56 pp. 10638– 10639 (1962).
CIBA Ltd., " Prop. for Destruction of Harmful etc.," (1967) CA 68 No. 68764 m. (1968).
Dvorko et al., " Cyclotrimerization of a Propiolic etc.," (1969) CA 70 No. 96122K (1969).
Tsukamoto, " Fungisidal Action of Methyl Thiocyanoacetate" (1951) CA 45 pp. 7719– 7720 (1951).

*Primary Examiner*—Lewis Gotts
*Assistant Examiner*—G. Hollrah
*Attorney*—Floyd Trimble

[57] ABSTRACT

The new compounds 2-thiocyanoacrylates, 2-thiocyano-2,3-dibromopropionates, and 2-thiocyano-2,3-dichloropropionates, which are useful as pesticides, and methods of preparing the same are described.

13 Claims, No Drawings

THIOCYANO SUBSTITUTED ACRYLATES AND PROPIONATES AND THEIR USE AS PESTICIDES

This invention relates to novel 2-thiocyanoacrylates, 2-thiocyano-2,3-dibromopropionates, and 2-thiocyano-2,3-dichloropropionates, their preparation, and their use as pesticides in controlling the growth and reproduction of microorganisms, nematodes, and insects. More particularly, the products of this invention are useful for the control of slime-forming and other microorganisms in industrial processes involving water and substances that are normally susceptible to microbiological degradation or deterioration in the presence of water, in which the growth and proliferation of such microorganisms interfere in the process itself or affect the quality or character of the resulting product.

Many industrial products when wet or when subjected to treatment in water are normally susceptible to bacterial and/or fungal degradation or deterioration if means are not taken to inhibit such degradation or deterioration. Wood pulp, wood chips, starch and proteinaceous substances, animal hides, vegetable tanning liquors, and leather are all damaged or degraded by growth of bacteria and other microorganisms or by enzymes produced by such growth. Wet pulp containing above 25 percent moisture content is subject to attack by stain, mold, and decay fungi. If not controlled, the result is a loss of useful fiber in badly decayed pulp, difficulty in dispersing partially decayed pulp, a darkening in color, and the development of undesirable odors caused by the growth of the microorganisms. Different species of molds are encountered at various stages in the manufacture of leather. As an example, soaking provides an environment highly conducive to the growth of microorganisms, and even strong pickle solutions are subject to attack by some microorganisms. Molds in particular may be troublesome and cause discoloration of the pickled stock, especially if it is held for a period of time. During the chrome tanning process, the chrome tanned stock held "in the blue" readily molds and is discolored. Mold growth may develop on heavy vegetable tanned leather during the drying period and produce spots and stains on either the flesh or grain sides.

Another objectionable phenomenon occurring in industrial process systems involving water is slime formation. Slime consists of matted deposits of microorganisms, fibers, and debris, and it may be stringy, pasty, rubbery, tapioca-like, hard, or horny, and it may have a characteristic odor that is different from that of the liquid suspensions in which it is formed. The microorganisms involved in its formation are primarily different species of sporeforming and nonsporeforming bacteria, particularly capsulated forms of bacteria which secrete gelatinous substances that envelop or encase the cells. Slime microorganisms also include filamentous bacteria, filamentous fungi of the mold type, yeasts, and yeast-like organisms.

Besides being objectionable from the standpoint of general cleanliness and sanitation in breweries, wineries, dairies, papermills and other industrial plants or establishments, slime may interfere and produce plugging of screens in pulp and paper systems, thus reducing their efficiency. When large amounts of slime become incorporated in the paper sheet, its strength is reduced, and it may consequently break and require rethreading of the machine. In the paper itself, slime may be responsible for unsightly spots, holes, and odors and may produce general discoloration throughout the sheet.

The compounds of this invention are also effective in controlling the growth and proliferation of sulfate-reducing bacteria. This is not only highly desirable but very unexpected because it has been extremely difficult to control the growth of sulfate-reducing bacteria by means of bactericides. In regard to the difficulty heretofore experienced in controlling such bacteria, reference is made to the paper by G. J. Guynes and E. O. Bennett entitled "The Sensitivity of Sulfate-Reducing Bacteria to AntiBacterial Agents," published in Producers Monthly, November 1958. These authors studied the effects of 28 organomercurial compounds and 63 phenolic compounds on such bacteria. Of the organomercurial compounds, none inhibited the growth of sulfate-reducing bacteria at concentrations as low as 50 parts per million. This is true despite the fact that organomercurial compounds are generally the most effective and versatile bacteriostatic compounds known. In many cases, these compounds will inhibit the growth of bacteria other than sulfate-reducing bacteria at a concentration or less than 1 part per million. Of the phenolic compounds studied, also known for their general effectiveness, only three reduced the growth of sulfate-reducing bacteria at concentrations as low as 25 parts per million.

When employed in agriculture, the organic thiocyanates of our invention are used as seed, plant, and soil pesticides for protecting seeds, seedlings emerging from seeds, and plants against attack by bacteria, fungi, nematodes, and insects.

It is, therefore, a principal object of the present invention to provide new and novel organic thiocyanates which obviate the disadvantages of the prior art pesticides.

It is another object of our invention to provide a composition for the control of microorganisms, nematodes, and insects in agricultural and industrial process systems.

These and other objects and advantages of the processes and compositions will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

In brief, the foregoing objects and advantages are attained by the use of the novel compounds of our invention, which may be defined as 2-thiocyanoacrylates having the general formula:

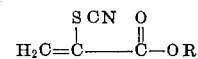

and the 2,3-dibromo- or 2,3-dichloro derivatives thereof wherein R is an alkyl group. As used herein, the term "alkyl group" is restricted to those containing one to eight carbon atoms but includes unsubstituted straight and branched chain alkyl groups and the corresponding substituted alkyl groups herein one or more of the hydrogens thereof is replaced by OH, Br, Cl, CN, SCN, $OCH_3$, or $OC_2H_5$.

The 2-thiocyanoacrylates as defined by the foregoing formula may be prepared by reacting an alkyl 2,3-dibrominated or 2,3-dichlorinated ester with a metal thiocyanate under alkaline conditions in an inert organic solvent and in the presence of a polymerization inhibitor. Suitable metal thiocyanates include the alkali-metal and the alkaline-earth-metal thiocyanates. Because it is available in large quantities and at an economical cost, we generally prefer ammonium thiocyanate. We have found that almost any polymerization inhibitor may be used. Inert organic solvents include alcohols, esters, and ketones. Since the reaction between the alkyl 2,3-dibrominated or 2,3-dichlorinated ester and the metal thiocyanate is equimolecular, we generally prefer to employ these two reactants in approximately equal molecular proportions.

The 2,3-dibrominated or 2,3-dichlorinated derivatives may be prepared by the bromination or the chlorination of an alkyl 2-thiocyanoacrylates dissolved in an inert solvent such as methylene chloride and preferably in the presence of dimethyl formamide as a halogenation catalyst. Other solvents that may be used include carbon disulfide, carbon tetrachloride, chloroform, or any inert polyhalogenated hydrocarbon.

The compounds of our invention are soluble in common organic solvents such as alkyl and aromatic hydrocarbons, alcohols, ketones, esters, ether alcohols, dimethyl formamide, dimethyl sulfoxide, and other solvents, The addition of a surfactant to the liquid or to the solution renders the compounds of the invention readily dispersible in water. In general, nonionic dispersants are preferred. Examples of such preferred nonionic dispersants include alkylphenoxypolyoxyethylene ethanol or alkylpolyoxy- ethylene ethanol. It should be understood, however, that suitable dispersants are not so limited.

As to the amount of these compounds which may be added to aqueous systems when used for the control of microorganisms, suitable quantities vary from 0.1 to 1,000 parts per million parts of water. It will be understood, of course, that larger quantities may be used but such larger quantities increase the cost of operation with limited material benefit.

In order to disclose the nature of the invention still more clearly, the following illustrative examples will be given. It is understood, however, that the invention is not to be limited to the specific conditions or details set forth in these examples, except insofar as such limitations are specified in the appended claims.

EXAMPLE 1

Methyl 2thiocyanoacrylate

In a three-liter four-neck, round bottom flask fitted with a mechanical stirrer, condenser, thermometer and heating mantle was placed 592 grams (2 moles) of methyl 2,3-dibromopropionate, 162 grams (2 moles) of sodium thiocyanate, 106 grams (1 mole) of sodium carbonate, 10 grams of hydroquinone and 1 liter of acetone. The resulting mixture was refluxed for 2 hours, cooled and poured into 1,600 milliliters of water. The organic and water phases were separated, the organic phase was washed with water and dried over anhydrous magnesium sulfate. After recovering the organic phase from the salt, the residual solvent was removed under reduced pressure. The crude methyl 2-thiocyanoacrylate was distilled under reduced pressure to give 122.3 grams of pure methyl 2-thiocyanoacrylate, b.p. 54°—6° C. (1 mm.) which was a 42.5 percent yield.

EXAMPLE 2

Ethyl 2-thiocyanoacrylate, b.p. 48°—52° C. (0.5 mm.), butyl 2thiocyanoacrylate, b.p. 78° C. (0.25 mm.), and $\beta$-cyanoethyl 2-thiocyanoacrylate in yields of 56, 20.5, and 92.5 percent, respectively, were prepared following the procedure of Example 1 wherein ethyl, butyl, and $\beta$-cyanoethyl 2,3-dibromopropionates were substituted for methyl 2,3-dibromopropionate

EXAMPLE 3

The compound 2-hydroxyethyl 2-thiocyanoacrylate was prepared in a 53.8 percent yield following the procedure of Example 1 wherein $\beta$hydroxyethyl 2,3-dibromopropionate was substituted for methyl 2,3-dibromopropionate and methylethyl ketone was used as the solvent instead of acetone.

EXAMPLE 4

Methyl 2,3-dichloro-2-thiocyanopropionate
In a 2-liter four-neck, round-bottom flask fitted with a mechanical stirrer, condenser, thermometer, and gas addition tube was placed 122.3 grams (0.85 mole) of methyl 2-thiocyanoacrylate, 5 milliliters of dimethyl formamide, and 400 milliliters of methylene chloride. Into this stirred reaction medium was bubbled 97 grams of chlorine gas causing no noticeable heat of reaction. The reaction was stirred at room temperature for 15 hours and the solvent removed by distillation to give 176.3 grams of crude methyl 2,3-dichloro- 2-thiocyanopropionate which was a 93 percent yield. Distillation of the crude product gave pure methyl 2,3-dichloro-2-thiocyanopropionate, b.p. 85°–90° C. (0.6 mm.) Anal. calcd. for $C_5H_5ClNO_2S$: Cl, 33.4; S, 14.9; N, 6.5. Found: Cl, 33.3; S, 14.9; N, 6.5.

EXAMPLE 5

Ethyl 2,3-dichloro-2thiocyanopropionate was prepared following the procedure of Example 4 wherein ethyl 2-thiocyanoacrylate was substituted for methyl 2-thiocyanoacrylate. The properties of the product after distillation were b.p. 76° C. (0.5 mm.), $n_D{}^{24}$ 1.4930. Anal. calcd. for $C_6H_7Cl_2NO_2S$: Cl, 31.0; N, 6.11; S,14.3. Found: Cl, 31.0; N, 6.3; S, 14..

EXAMPLE 6

Methyl 2,3-dibromo-2-thiocyanopropionate was prepared in an 81.7 percent yield following the procedure of Example 4 wherein bromine was substituted for chlorine.

EXAMPLE 7

Butyl 2,3-dibromo-2-thiocyanoproprionate was prepared in a 94.2 percent yield following the procedure of Example 4 wherein butyl 2-thiocyanoacrylate was substituted for methyl 2-thiocyanoacrylate and bromine was substituted for chlorine.

Other 2-thiocyanoacrylates may be prepared as will be obvious to those skilled in the art following the foregoing procedures by substituting the appropriate reactants for those used in Examples 1 and 4. For example, other alkyl or substituted alkyl 2-thiocyanoacrylates may be prepared following the procedure for Example 1 by substituting the appropriate alkyl or substituted alkyl 2,3-dibromopropionate for methyl 2,3-dibromopropionate. Other alkyl or substituted alkyl 2,3-dibromo- or 2,3-dichloro-2-thiocyanopropionates may be prepared following the procedure of Example 4 by substituting the appropriate alkyl or substituted alkyl 2-thiocyanoacrylate for the methyl 2-thiocyanoacrylate used in Example 4 wherein either bromine or chlorine in used as desired.

EXAMPLE 8

The 2-thiocyanoacrylates and the 2,3-dihalogenated derivatives thereof listed in Table 1 were tested by the pulp-substrate method described in U.S. Pat. No. 2,881,070 which disclosure is hereby made a part of this application, using *Aerobacter aerogenes* and pulp substrates that were buffered to pH values of 5.5, 6.5, and 7.5, respectively. The results are tabulated in Table 1.

TABLE 1

Percentage kill of *Aerobacter aerogenes* in a pulp substrate at pH 5.5, 6.5, and 7.5 after 18 hr. contact with the compounds listed below

| pH | Concentration, p.p.m. | Methyl 2,3-dichloro-2-thiocyanopropionate | Ethyl 2,3-dichloro-2-thiocyanopropionate | Butyl 2,3-dichloro-2-thiocyanopropionate | Methyl 2,3-dibromo-2-thiocyanopropionate | Butyl 2,3-dibromo-2-thiocyanopropionate | $\beta$-Hydroxyethyl 2-thiocyanoacrylate | Isobutyl 2-thiocyanoacrylate | Methyl 2-thiocyanoacrylate | Ethyl 2-thiocyanoacrylate | Butyl 2-thiocyanoacrylate | $\beta$-Chloroethyl 2-thiocyanoacrylate | $\beta$-Cyanoethyl 2-thiocyanoacrylate | $\beta$-Methoxyethyl 2-thiocyanoacrylate |
|---|---|---|---|---|---|---|---|---|---|---|---|---|---|---|
| 5.5 | 0.1 | 17 | 18 | 0 | 9 | 0 | 7 | 0 | 84 | 43 | 0 | 16 | 51 | 15 |
| 5.5 | 0.3 | 0 | 0 | 2 | | 33 | 39 | 26 | 99.9 | 99 | 52 | 23 | 96 | 0 |
| 5.5 | 0.5 | 30 | 31 | 38 | 99 | 15 | 69 | 30 | 99.9 | 99.9 | 94 | 96 | 97 | 0 |
| 5.5 | 0.7 | | | | 99.9 | 17 | 93 | 17 | 99 | 99.9 | 97 | 66 | 99 | 0 |
| 5.5 | 1 | 97 | 27 | 0 | 100 | 40 | 98 | 59 | 99.8 | 99.8 | 98 | 79 | 99.5 | 15 |
| 5.5 | 2 | 99.9 | 10 | 0 | 100 | 17 | 99.9 | 98 | | 100 | 99.95 | 99.7 | 99.8 | 95 |
| 5.5 | 4 | 99 | 90 | 93 | 100 | 50 | 99.8 | 97 | | 100 | 99.97 | 100 | 100 | 99.7 |
| 5.5 | 8 | 99.7 | 99.8 | 99 | 100 | 99.6 | 100 | 98 | | 100 | 99.5 | 100 | 100 | 99.9 |
| 6.5 | 0.1 | 0 | 7 | 56 | 81 | 20 | 29 | 1 | 43 | 21 | 35 | 0 | 0 | 47 |
| 6.5 | 0.3 | 5 | 2 | 1 | 4 | 35 | 0 | 99.6 | 99.5 | 36 | 30 | 43 | 56 |
| 6.5 | 0.5 | 13 | 8 | 0 | 99 | 0 | 79 | 42 | 99.9 | 99.6 | 43 | 36 | 77 | 4 |
| 6.5 | 0.7 | | | | 97 | 14 | 95 | 14 | 99.6 | 99.8 | 98 | 31 | 97 | 42 |

TABLE 1

Percentage kill of *Aerobacter aerogenes* in a pulp substrate at pH 5.5, 6.5, and 7.5 after 18 hr. contact with the compounds listed below

| pH | Concentration, p.p.m. | Methyl 2,3-dichloro-2-thiocyanopropionate | Ethyl 2,3-dichloro-2-thiocy-anopropionate | Butyl 2,3-dichloro-2-thiocy-anopropionate | Methyl 2,3-dibromo-2-thiocyanoacrylate | Butyl 2,3-dibromo-2-thiocyano-propionate | β-Hydroxyethyl 2-thiocyano-acrylate | Isobutyl 2-thio-cyano-acrylate | Methyl 2-thio-cyano-acrylate | Ethyl 2-thio-cyano-acrylate | Butyl 2-thio-cyano-acrylate | β-Chloroethyl 2-thio-cyano-acrylate | β-Cyanoethyl 2-thio-cyano-acrylate | β-Methoxyethyl 2-thiocyano-acrylate |
|---|---|---|---|---|---|---|---|---|---|---|---|---|---|---|
| 6.5 | 1 | 95 | 0 | 30 | 99 | 6 | 99 | 6 | 99 | 99.9 | 97.7 | 82 | 99 | 29 |
| 6.5 | 2 | 99.7 | 0 | 22 | 99.97 | 4 | 99.9 | 93 | | 100 | 99 | 99.9 | 99 | 89 |
| 6.5 | 4 | 100 | 97 | 94 | 99.8 | 11 | 99.99 | 97 | | 100 | 99.7 | 99.8 | 100 | 92 |
| 6.5 | 8 | 99.8 | 99 | 99.5 | 100 | 95 | 99.98 | 99.8 | | 100 | 99.98 | 99.98 | 100 | 99.8 |
| 7.5 | 0.1 | 0 | 33 | 0 | 76 | 6 | 1 | | 39 | 4 | 0 | 62 | 68 | 0 |
| 7.5 | 0.3 | 19 | 29 | 13 | | 3 | 83 | 6 | 99 | 99 | 45 | 87 | 96 | 0 |
| 7.5 | 0.5 | 93 | 0 | 17 | 91 | 40 | 88 | 26 | 9917 | 99 | 88 | 90 | 97 | 0 |
| 7.5 | 0.7 | | | | 99.6 | 26 | 97 | 49 | 99.6 | 99.9 | 99 | 96 | 99.7 | 4 |
| 7.5 | 1 | 99.7 | 47 | 48 | 99 | 0 | 99 | 37 | 99.8 | 99.95 | 99.8 | 99 | 99.8 | 63 |
| 7.5 | 2 | 99.7 | 97 | 63 | 99.97 | 55 | 99.9 | 79 | | 100 | 99.98 | 99.8 | 100 | 89 |
| 7.5 | 4 | 99.7 | 99 | 99 | 100 | 97 | 99.9 | 99 | | 100 | 99.7 | 99.9 | 100 | 99 |
| 7.5 | 8 | 99.99 | 95 | 99.7 | 100 | 99 | 100 | 100 | | 100 | 99.8 | 100 | 100 | 100 |

EXAMPLE 9

The effect of the 2-thiocyanoacrylates and the 2,3-dihalogenated derivatives thereof listed in Table 2 on the three fungi, *Aspergillus niger*, *Penicillium roqueforti*, and *Chaetomium globosum*, was determined in this example. The method used was the described in Example 1 U.S. Pat. No. 3,306,810 which disclosure is hereby made a part of this application.

Growth was recorded on the basis of the following key:

4 = excellent
3 = good
2 = poor
1 = very poor, scant, questionable
0 = no growth The results are summarized in Table 2

TABLE 2

Inhibition of *Aspergillus niger*, *Penicillium roqueforti*, and *Chaetomium globosum* by the compounds listed below in a pulp substrate method after 14 days incubation

| Test organism | Concentration, p.p.m. | Methyl 2,3-dichloro-2-thiocy-anopropionate | Ethyl 2,3-dichloro-2-thiocy-anopropionate | Butyl 2,3-dichloro-2-thiocy-anopropionate | Methyl 2,3-dibromo-2-thiocy-anopropionate | Butyl 2,3-dibromo-2-thiocyano-propionate | β-Hydroxyethyl 2-thiocy-ano-acrylate | Isobutyl 2-thio-cyano-acrylate | Methyl 2-thio-cyano-acrylate | Ethyl 2-thio-cyano-acrylate | Butyl 2-thio-cyano-acrylate | β-Chloroethyl 2-thio-cyano-acrylate | β-Cyanoethyl 2-thio-cyano-acrylate | β-Methoxyethyl 2-thiocy-ano-acrylate |
|---|---|---|---|---|---|---|---|---|---|---|---|---|---|---|
| *Aspergillus niger* | 1 | 4 | 4 | 4 | 4 | 4 | 4 | 4 | 4 | 4 | 4 | 4 | 4 | 4 |
| Do | 3 | 4 | 4 | 4 | 4 | 4 | 4 | 4 | 3 | 4 | 4 | 4 | 4 | 4 |
| Do | 5 | 0 | 4 | 0 | 0 | 4 | 4 | 4 | 0 | 4 | 1 | 4 | 4 | 4 |
| Do | 10 | 0 | 0 | 0 | 0 | 4 | 0 | 4 | 0 | 0 | 0 | 0 | 4 | 4 |
| Do | 20 | 0 | 0 | 0 | 0 | 3 | 0 | 4 | 0 | 0 | 0 | 0 | 0 | 4 |
| Do | 25 | 0 | 0 | 0 | 0 | 0 | 0 | 0 | 4 | 0 | 0 | 0 | 0 | 3 |
| Do | 50 | 0 | 0 | 0 | 0 | 0 | 0 | 3 | 0 | 0 | 0 | 0 | 0 | 0 |
| Do | 100 | 0 | 0 | 0 | | | | | | | 0 | | | |
| *Penicillium roqueforti* | 1 | 4 | 4 | 4 | 4 | 4 | 4 | 4 | 4 | 4 | 4 | 4 | 4 | 4 |
| Do | 3 | 0 | 4 | 2 | 0 | 4 | 4 | 4 | 0 | 4 | 4 | 4 | 4 | 4 |
| Do | 5 | 0 | 4 | 1 | 0 | 4 | 4 | 4 | 0 | 4 | 1 | 4 | 4 | 4 |
| Do | 10 | 0 | 0 | 0 | 0 | 4 | 0 | 4 | 0 | 2 | 0 | 0 | 0 | 4 |
| Do | 15 | 0 | 0 | 0 | 0 | 4 | 0 | 3 | 0 | 0 | 0 | 0 | 0 | 4 |
| Do | 20 | 0 | 0 | 0 | 0 | 3 | 0 | 0 | | 0 | 0 | 0 | 0 | 4 |
| Do | 25 | 0 | 0 | 0 | 0 | 0 | 0 | 0 | | 0 | 0 | 0 | 0 | 4 |
| Do | 50 | 0 | 0 | 0 | 0 | 0 | 0 | 0 | | 0 | 0 | 0 | 0 | 0 |
| Do | 100 | 0 | 0 | 0 | | | | | | | 0 | | | |
| *Chaetomium globosum* | 1 | 3 | 4 | 4 | 4 | 4 | 4 | 4 | 4 | 4 | 4 | 0 | 0 | 4 |
| Do | 3 | 0 | 2 | 3 | 4 | 4 | 0 | 4 | 0 | 4 | 4 | 0 | 0 | 4 |
| Do | 5 | 0 | 0 | 0 | 2 | 4 | 0 | 4 | 0 | 4 | 4 | 0 | 0 | 4 |
| Do | 10 | 0 | 0 | 0 | 0 | 4 | 0 | 4 | 0 | 1 | 0 | 0 | 0 | 4 |
| Do | 15 | 0 | 0 | 0 | 0 | 3 | 0 | 3 | 0 | 0 | 0 | 0 | 0 | 4 |
| Do | 20 | 0 | 0 | 0 | 0 | 0 | 0 | 0 | | 0 | 0 | 0 | 0 | 4 |
| Do | 25 | 0 | 0 | 0 | 0 | 0 | 0 | 0 | | 0 | 0 | 0 | 0 | 3 |
| Do | 50 | 0 | 0 | 0 | | | 0 | | | 0 | | 0 | 0 | 0 |
| Do | 100 | 0 | 0 | 0 | | | | | | | | | | |

4 = excellent growth; 3 = good; 2 = poor; 1 = very poor; 0 = no growth.

The organic compounds of this invention may be used diluted with a carrier which may be liquid or solid. Dusts may be prepared with a finely divided solid such as talc, clay, pyrophyllite, diatomaceous earth, hydrated silica, calcium silicate, or magnesium carbonate. If desired, wetting and/or dispersing agents may be used. When the proportions of these are increased, there results a wettable powder, which may be dispersed in water and applied from a spray.

Dusts may contain 1 percent to 15 percent of one or more compounds of this invention, while wettable powders may contain up to 50 percent or more of one or more of these compounds.

A typical formulation of a wettable powder comprises 20 percent to 50 percent of the organic compounds, 45 percent to 75 of one or more finely divided solids, 1 percent to 5 percent of a wetting agent, and 1 to 5 percent of a dispersing agent. Typical wetting agents include sodium dodecyl sulfate, sodium nonylbenzene sulfonate, sodium dioctyl sulfosuccinate, octylphenoxypolyethoxyethanol, or other nonionic agents, such as ethylene and/or propylene oxide condensates with long chained alcohols, mercaptans, amines, or carboxylic acids. Typical dispersing agents include the sodium sulfonate of condensed naphthalene-formaldehyde and lignin sulfonates.

Liquid concentrates may also be used. These are prepared by taking up the organic compounds in an organic solvent together with one or more surface active agents. For example, there may be mixed 60 parts of one of the organic compounds, 20 parts of a surface-active solvent-soluble alkylphenoxypolyethoxyethanol and 20 parts of aromatic mineral spirits or xylene.

The compounds of this invention may be used in conjunction with other fungicidal agents and also in conjunction with miticides or insecticides or other pesticides.

While particular embodiments of the invention have been described it will be understood, of course, that the invention is not limited thereto since many modifications may be made, and it is therefore, contemplated to cover by the appended claims any such modifications as fall within the true spirit and scope of the invention.

The invention having thus been described, what is claimed and desired to be secured by Letters Patent is:

1. A compound of the formula:

$$H_2C=C(SCN)-C(=O)-OR$$

and the 2,3-dichloro or -dibromo derivatives thereof wherein R is an alkyl group containing one to four carbon atoms or a substituted alkyl group containing one to four carbon atoms wherein one or two of the hydrogens thereof is replaced by OH, Cl, or CN.

2. A compound of the formula:

$$H_2C=C(SNC)-C(=O)-O-R$$

wherein R is an alkyl group containing one to four carbon atoms or a substituted alkyl group containing one to four carbon atoms wherein one or two of the hydrogens thereof is replaced by OH, Cl, or CN.

3. A compound of the formula:

$$H_2C(X)-C(X)(SCN)-C(=O)-O-R$$

wherein X is bromine or chlorine and R is an alkyl group containing one to four carbon atoms or a substituted alkyl group containing one to four carbon atoms wherein one or two of the hydrogens thereof is replaced by OH, Cl, or CN.

4. The compound of claim 2 wherein R is methyl.
5. The compound of claim 2 wherein R is ethyl.
6. The compound of claim 2 wherein R is n-butyl.
7. The compound of claim 2 wherein R is β-chloroethyl.
8. The compound of claim 2 wherein R is β-hydroxyethyl.
9. The compound of claim 2 wherein R is β-cyanoethyl.
10. The compound of claim 3 wherein X is chlorine and R is methyl.
11. The compound of claim 3 wherein X is bromine and R is methyl.
12. The compound of claim 3 wherein X is chlorine and R is β-cyanoethyl.
13. The compound of claim 3 wherein X is bromine and R is β-cyanoethyl.

* * * * *